United States Patent
Miao et al.

(10) Patent No.: US 8,934,410 B2
(45) Date of Patent: Jan. 13, 2015

(54) TRANSMISSION SCHEME

(75) Inventors: Qingyu Miao, Beijing (CN); Youping Su, Beijing (CN); Lei Ziao, Beijing (CN); Huaisong Zhu, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 157 days.

(21) Appl. No.: 13/255,462

(22) PCT Filed: Oct. 21, 2009

(86) PCT No.: PCT/SE2009/051198
§ 371 (c)(1),
(2), (4) Date: Sep. 8, 2011

(87) PCT Pub. No.: WO2010/104438
PCT Pub. Date: Sep. 16, 2010

(65) Prior Publication Data
US 2011/0317629 A1    Dec. 29, 2011

Related U.S. Application Data

(60) Provisional application No. 61/158,938, filed on Mar. 10, 2009.

(51) Int. Cl.
| | |
|---|---|
| *H04W 4/00* | (2009.01) |
| *H04B 7/06* | (2006.01) |
| *H04B 10/25* | (2013.01) |
| *H04B 7/185* | (2006.01) |
| *H04B 7/00* | (2006.01) |
| *H04M 1/00* | (2006.01) |
| H04W 28/18 | (2009.01) |
| H04W 84/04 | (2009.01) |

(52) U.S. Cl.
CPC .............. *H04B 7/0617* (2013.01); *H04B 10/25* (2013.01); *H04W 28/18* (2013.01); *H04W 84/042* (2013.01)
USPC ........... 370/328; 455/561; 455/13.4; 455/522

(58) Field of Classification Search
None
See application file for complete search history.

(56) References Cited

U.S. PATENT DOCUMENTS

| | | |
|---|---|---|
| 2004/0096222 A1 | 5/2004 | Cagenius |
| 2008/0273609 A1* | 11/2008 | Murakami et al. ............ 375/260 |

(Continued)

FOREIGN PATENT DOCUMENTS

| | | |
|---|---|---|
| WO | 9810600 A1 | 3/1998 |
| WO | 2004/095862 A1 | 11/2004 |

(Continued)

OTHER PUBLICATIONS

Common Public Radio Interface. CPRI Specification V4.1 (Feb. 18, 2009). Common Public Radio Interface (CPRI); Interface Specification. Feb. 18, 2009.

*Primary Examiner* — Ayaz Sheikh
*Assistant Examiner* — Sori Aga
(74) *Attorney, Agent, or Firm* — Coats & Bennett, PLLC

(57) ABSTRACT

In a transmission scheme for transmitting data over a connection connecting a transmitting Main Unit and a receiving Radio Unit of a cellular radio system, where the transmitted data corresponds to user-plane data in the form of digital baseband data for different antenna-carriers, the digital signal is transmitted over the connection, e.g. a fiber, before spreading and combining is provided. The power and weight factor is transmitted separately with a few additional bits. Hereby, the Digital signal before spreading and combining is transmitted in the fiber instead of the combined multi-code signal.

18 Claims, 2 Drawing Sheets

(56) References Cited

U.S. PATENT DOCUMENTS

2009/0290632 A1 11/2009 Wegener
2011/0275376 A1* 11/2011 Boldi et al. .................. 455/436

FOREIGN PATENT DOCUMENTS

| WO | 2005/034544 A1 | 4/2005 |
| WO | 2006102919 A1 | 10/2006 |

* cited by examiner

TRANSMISSION SCHEME

TECHNICAL FIELD

The present invention relates to a method and a device for transmitting data.

BACKGROUND

In the MU (Main Unit)/RRU (Remote Radio Unit) structure of a radio system, such as a cellular radio system and in particular a Time Division Synchronous Code Division Multiple Access (TD-SCDMA) radio system, a fiber is used to connect the MU and RRU. In CPRI (Common Public Radio Interface), it is also called REC (Radio Equipment control)/RE (Radio Equipment). The data transfer in the fiber follows the Ir or the CPRI specification, which includes the user-plane data, i.e., typically the digital baseband (IQ) data for different antenna-carriers (A×C). The IQ data is the chip level symbols after spreading, which is combining multi-code signal including power and weights factor information. The signal is quantized to a few bits, normally 16 bits.

In FIG. 1 the structure of the MU/RRU is depicted.

Different antenna-carriers (A×C) transport different data. Due to the limitation of fiber capacity, the 2.5 Gbps fiber can only support the data for 48 A×C. (8 antenna and 6 carriers). Currently China Mobile Communication Corporation CMCC requires that 9 carriers or 12 carriers can be supported, which can not support by 2.5 Gbps fiber.

To solve the limitation of fiber capacity, a few solutions have been proposed:

1. Use a high speed fiber (3.7 G or 5 G)
2. Use 2 2.5 Gbps fiber
3. Automatic Gain Control (AGC) is used for the IQ data. (The IQ bit-length can be reduced from 16 to 10).

The first solution is very expensive with high speed fiber. The cost of the second solution will be doubled. Simulation shows that the third solution has little effect in the uplink performance. The down link (DL) performance (such as EVM, PCDE) of the third solution will be affected. The solution can not support 12 carriers.

Hence there exists a need for an improved method and device that can meet the above requirements.

SUMMARY

It is an object of the present invention to provide an improved method and device to address the problems as outlined above.

This object and others are obtained by the method and device as set out in the appended claims.

Thus, in accordance with the present invention, a transmission scheme where the digital signal is transmitted over the connection, e.g. a fiber, before spreading and combining is provided. The power and weight factor is transmitted separately with a few additional bits. Hereby, the Digital signal before spreading and combining is transmitted in the fiber instead of the combined multi-code signal.

In accordance with a first embodiment, the user-plane data, typically IQ data, for each of the downlink codes is transmitted before combining. The factor of the power and weights for each code is also transmitted. After receiving the user-plane data, the receiving RRU sums the received user-plane data of all the codes with the received factor of the power and weights, which can be easily handled by the Field-Programmable Gate Array (FPGA) in the RRU. The user-plane data (IQ data) for each downlink codes are the same for all the antennas. The factor of the power and weights for the antennas can be different. The factor of the power for midamble part and data part can be different.

In accordance with a second embodiment the symbol data for each downlink codes is transmitted before spreading. Also, the factor of the power and weights for each code is transmitted. After receiving the symbol data, the receiving RRU spreads the code and sums the user-plane data (IQ data) of all the code with the factor of the power and weights. The data for each downlink codes are the same for all the antennas. The factor of the power and weights for the antenna can be different. The factor of the power for midamble part and data part can be different. For the midamble part, a midamble identity (ID) can be transmitted instead of the real midmable code.

The invention also extends to a transmitter and a receiver adapted to transmit and to receive data in accordance with the above data transmission schemes. The different transmission schemes can in accordance with one embodiment be software implemented.

BRIEF DESCRIPTION OF THE DRAWINGS

The present invention will now be described in more detail by way of non-limiting examples and with reference to the accompanying drawings, in which.

DETAILED DESCRIPTION

Figure 1:
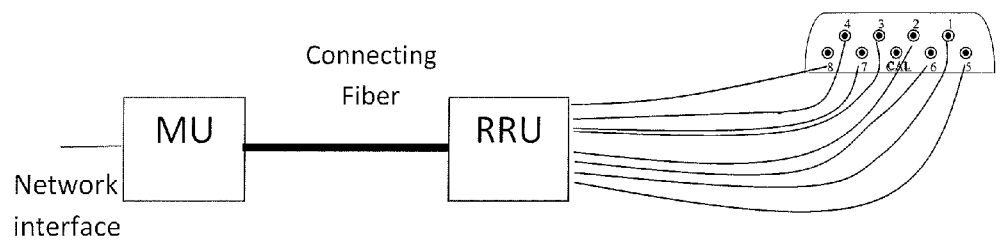
-FIG. 1 is a view illustrating the structure of a MU/RRU.
Figure 2:
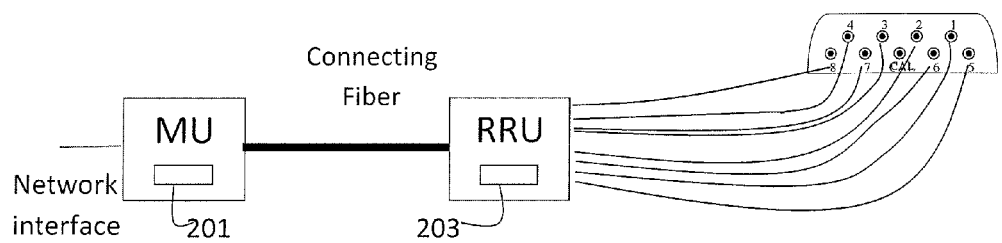
-FIG. 2 is a view illustrating a modified structure of a MU/RRU.

In FIG. 2, a view of a MU/RRU structure similar to the structure of FIG. 1 is depicted. The MU comprises a module 201 for transmitting data over a connection connecting a transmitting Main Unit (MU) and a receiving Remote Radio Unit (RRU) of a cellular radio system, where transmitted data corresponds to user-plane data in the form of digital baseband data for different antenna-carriers. The module 201 is adapted to transmit the digital signal before spreading and combining the digital signal. The module 201 is further adapted to transmitting a power and a weight factor separately to the receiving RRU with a few additional bits. Hereby, the Digital signal before spreading and combining is transmitted in the fiber instead of the combined multi-code signal.

The receiving RRU is provided with a corresponding module 203 to receive the signal transmitted in accordance with the above. Hence, the module 203 is adapted to receive an un-spread and un-combined digital signal from the transmitter, and to separately receive a power and a weight factor. The module 203 can also be adapted to, after receiving the user plane data, summing the received user plane data of all the codes with the received factor of the power and weights.

The modules 201 and 203 can advantageously be software implemented, whereby no physical alteration of an existing structure is required.

Figure 3:
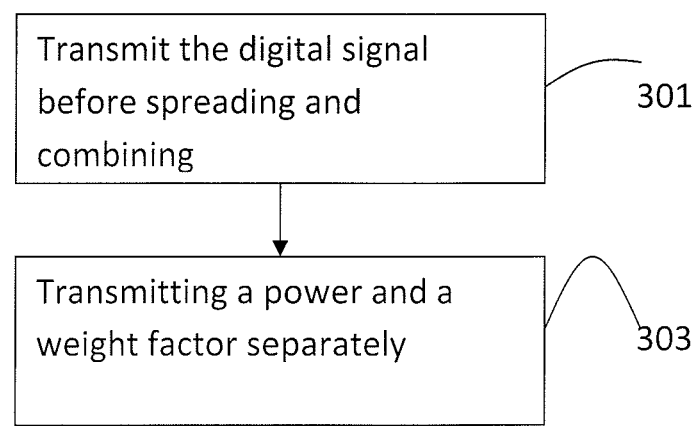
-FIG. 3 is a flowchart illustrating some procedural steps performed when transmitting data from a MU to a RRU.

In FIG. 3, some procedural steps performed when transmitting/receiving user-plane data in accordance with the above are illustrated. Thus, in a method of transmitting data over a connection connecting a transmitting Main Unit and a receiving Radio Unit of a cellular radio system, where the transmitted data corresponds to user-plane data in the form of digital baseband data for different antenna-carriers, the following steps can be performed. First, in a step 301, the digital signal before spreading and combining the digital signal is transmitted. Next, in a step 303 a power and a weight factor are transmitted separately to the receiver. The corresponding steps can be performed by the receiver.

In accordance with a first embodiment, the IQ data for each of the downlink codes is transmitted before combining. The factor of the power and weights for each code is also transmitted. After receiving the IQ data, RRU sums the received IQ data of all the codes with the received factor of the power and weights, which can be easily handled by the FPGA in the RRU. The IQ data for each downlink codes are the same for all the antennas.

The factor of the power and weights for the antennas can be different. The factor of the power for midamble part and data part can be different.

In accordance with a second embodiment the symbol data for each downlink codes is transmitted before spreading. Also, the factor of the power and weights for each code is transmitted. After receiving the symbol data, RRU spreads the code and sums the IQ data of all the code with the factor of the power and weights. The data for each downlink codes are the same for all the antennas. The factor of the power and weights for the antenna can be different. The factor of the power for midamble part and data part can be different. For the midamble part, a midamble ID can be transmitted instead of the real midamble code.

Below a comparison between different approaches is performed.

Conventional Method

In the traditional method without AGC, the number of bits of 48 A×C (8 antenna and 6 carriers) in one slot is: 16*2*848*8*6=1302528 Each IQ symbol have 16*2 bits. There are 848 symbols in one slot. There are 8 antenna and 6 carriers Conventional Method with AGC In the conventional method with AGC, the number of bits is: 10*2*848*8*6+6=814080 Each IQ symbol has 10*2 bits. There are additional 6 bits for AGC factor.

First Embodiment

The number of bits for the transmission scheme in accordance with the first embodiment is: (2*848+16*2*8+16*2*8)*6*16=211968 for QPSK (4*848+16*2*8+16*2*8)*6*16=374784 for 16QAM (6*848+16*2*8+16*2*8)*6*16=537600 for 64QAM Each IQ symbol has 2 bits for QPSK, 4 bits for 16QAM, 6 bits for 64QAM. There are additional 16*2 bits for power factor. There are additional 16*2 bits for beamforming weights. There are 16 spreading codes and each code has different value.

Second Embodiment

The number of bits for the transmission scheme in accordance with the second embodiment in one slot is: (2*44+16*2*8+16*2*8+5)*6*16=58080 for QPSK (4*44+16*2*8+16*2*8+5)*6*16=66528 for 16QAM (6*44+16*2*8+16*2*8+5)*6*16=74976 for 64QAM Each symbol has 2 bits for QPSK, 4 bits for 16QAM, 6 bits for 64QAM. There are 44 symbols for spreading 16. There are additional 16*2 bits for power factor. There are additional 16*2 bits for beamforming weights. Additional 5 bits are used to identify the midamble shifting. There are 16 spreading codes and each code has different value.

Using the transmission method and the sender and the receiver as described herein will significantly reduce the amount of data between MU and RRU. The only alteration needed in a conventional system is the use of different software in the transmitter and receiver. The method, sender and receiver can advantageously be used in a TD-SCDMA system and also other cellular radio systems such as a Time Division Duplex—Long Term Evolution (TDD-LTE) system.

The invention claimed is:

1. A method of transmitting user-plane data as digital baseband data from a Main Unit to a Radio Unit of a cellular radio system over a connection connecting the Main Unit and the Radio Unit, the method comprising:
   transmitting the user-plane data to the Radio Unit before spreading and combining; and
   transmitting a power factor and a weight factor, separately from one another and separately from the user plane data to the Radio unit, for use in weighting and combining of the user-plane data with respect to different antenna carriers at the Radio Unit, wherein the power factor is based on a power update control signal and a power ratio between different antennas.

2. The method according to claim 1, wherein transmitting the power and weight factors comprises transmitting the power and weight factors separately from one another and separately from the user plane data for each of a plurality of downlink codes.

3. The method according to claim 2, wherein transmitting the user-plane data before spreading and combining comprises transmitting the user-plane data for each downlink code before combining.

4. The method according to claim 2, wherein transmitting the user-plane data before spreading and combining comprises transmitting symbol data for each downlink code before spreading.

5. A method of receiving user-plane data as digital baseband data from a Main Unit at a Radio Unit of a cellular radio system over a connection connecting the Main Unit and the Radio Unit, the method comprising:
   receiving un-spread and un-combined user-plane data from the Main Unit; and
   receiving a power factor and a weight factor, separately from one another and separately from the user plane data, for use in weighting and combining of the received user-plane data with respect to different antenna carriers, wherein the power factor is based on a power update control signal and a power ratio between different antennas.

6. The method according to claim 5, wherein receiving the power and weight factors comprises receiving the power and weight factors separately from one another and separately from the user plane data for each of a plurality of downlink codes.

7. The method according to claim 6, wherein receiving the un-spread and un-combined user-plane data comprises receiving the un-combined user-plane data for each of the downlink codes.

8. The method according to claim 6, wherein receiving the un-spread and un-combined user-plane data comprises receiving un-spread symbol data for each of the downlink codes.

9. The method according to claim 6, further comprising:
   combining the received user-plane data for all of the downlink codes with the received power and weight factors.

10. A transmitter for transmitting user-plane data as digital baseband data from a Main Unit to a Radio Unit of a cellular radio system over a connection connecting the Main Unit and the Radio Unit, the transmitter configured to:
    transmit the user-plane data to the Radio Unit before spreading and combining; and
    transmit a power factor and a weight factor, separately from one another and separately from the user plane data to the Radio Unit, for use in weighting and combining of the user-plane data with respect to different antenna carriers at the Radio Unit, wherein the power factor is based on a power update control signal and a power ratio between different antennas.

11. The transmitter according to claim 10, wherein the transmitter is configured to transmit the power and weight factors separately from one another and separately from the user plane data for each of a plurality of downlink codes.

12. The transmitter according to claim 11, wherein the transmitter is configured to transmit the user-plane data by transmitting the user-plane data for each of the downlink codes before combining.

13. The transmitter according to claim 11, wherein the transmitter is configured to transmit the user-plane data by transmitting symbol data for each of the downlink codes before spreading.

14. A receiver for receiving user-plane data as digital baseband data from a Main Unit at a Radio Unit of a cellular radio system over a connection connecting the Main Unit and the Radio Unit, the receiver configured to:
receive un-spread and un-combined user-plane data from the Main Unit; and
receive a power factor and a weight factor, separately from one another and separately from the user plane data, for use in weighting and combining of the received user-plane data with respect to different antenna carriers, wherein the power factor is based on a power update control signal and a power ratio between different antennas.

15. The receiver according to claim 14, wherein the receiver is configured to receive the power and weight factors separately from one another and separately from the user plane data for each of a plurality of downlink codes.

16. The receiver according to claim 15, wherein the receiver is configured to receive the un-combined and un-spread user-plane data by receiving the un-combined user-plane data for each of the downlink codes.

17. The receiver according to claim 15, wherein the receiver is configured to receive the un-combined and un-spread user-plane data by receiving un-spread symbol data for each of the downlink codes.

18. The receiver according to claim 15, wherein the receiver is further configured to combine the received un-spread and un-combined user-plane data for all of the downlink codes with the received power and weight factors.

* * * * *

UNITED STATES PATENT AND TRADEMARK OFFICE
CERTIFICATE OF CORRECTION

| | | |
|---|---|---|
| PATENT NO. | : 8,934,410 B2 | Page 1 of 1 |
| APPLICATION NO. | : 13/255462 | |
| DATED | : January 13, 2015 | |
| INVENTOR(S) | : Miao et al. | |

It is certified that error appears in the above-identified patent and that said Letters Patent is hereby corrected as shown below:

On the Title Page, in item (75), under "Inventors", in Column 1, Line 2, delete "Lei Ziao," and insert -- Lei Xiao, --, therefor.

Signed and Sealed this
Seventh Day of July, 2015

Michelle K. Lee
*Director of the United States Patent and Trademark Office*